N. E. ALLEN.
Sheep-Rack.

No. 209,207. Patented Oct. 22, 1878.

WITNESSES:
W. W. Hollingsworth
Amos W. Hart

INVENTOR:
N. E. Allen
BY
ATTORNEYS.

UNITED STATES PATENT OFFICE.

NELSON E. ALLEN, OF BEAVER DAM, WISCONSIN.

IMPROVEMENT IN SHEEP-RACKS.

Specification forming part of Letters Patent No. 209,207, dated October 22, 1878; application filed September 4, 1878.

*To all whom it may concern:*

Be it known that I, NELSON E. ALLEN, of Beaver Dam, in the county of Dodge and State of Wisconsin, have invented a new and Improved Sheep-Rack; and I do hereby declare that the following is a full, clear, and exact description of the same.

My invention is an improvement in the class of feed-racks having a double trough and swinging racks, which are pivoted on the respective sides of the latter.

The invention consists in the construction and arrangement of parts, as hereinafter described, whereby the unconsumed feed or hay which the stock will not eat may be discharged from the rack by tilting one or both of the racks proper, and whereby, also, the racks may be so placed as to exclude sheep and other stock from the trough while grain is being placed in it.

Figure 1:
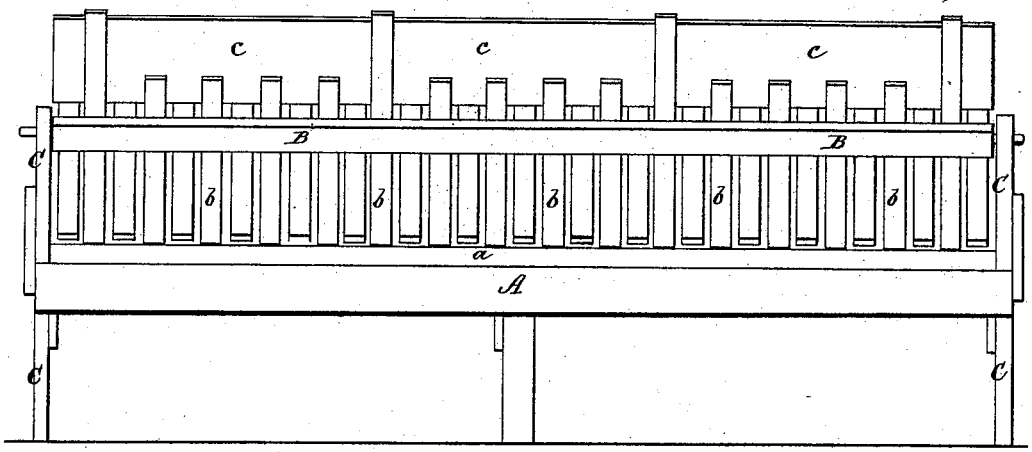
Figure 2:
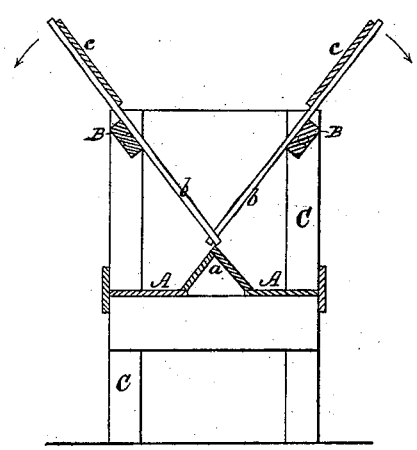
Figure 3:
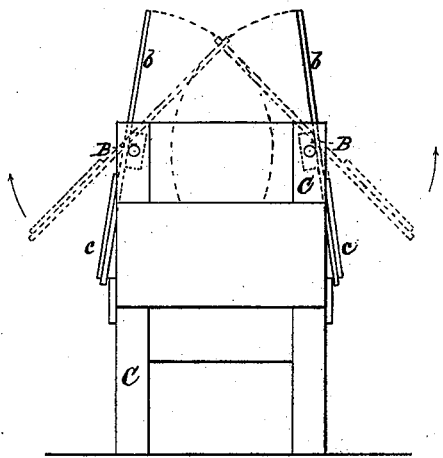

In the accompanying drawing, forming part of this specification, Figure 1 is a side elevation of my improved rack. Fig. 2 is a vertical cross-section of the same. Fig. 3 is an end view, showing the swinging racks inverted to prevent access to the feed-trough.

The feed-rack is composed of the double trough A, having the central lengthwise rib or partition $a$, and of the racks proper, B B, which are pivoted to the upper ends of the standards or legs C C. The arms $b$ of the respective racks B are made of such length that their lower ends project over the partition $a$, as shown in Fig. 1, and interlace or alternate one with another. The outer portions, $c$, of the racks B are made solid.

It is apparent from this construction of the racks and their arrangement with reference to the trough A and its partition $a$ that when it is desired to remove the unconsumed or refuse hay from the rack it can be quickly effected by turning over one or both racks proper, B, thus causing the arms $b$ to carry the hay upward and throw it out upon the ground. When the racks are thus turned on their pivots into the position shown in dotted lines—that is to say, so that they are vertical, or nearly so, on the sides of the frame—the arms $b$ will project upward and the solid or imperforate portions $c$ downward. The latter will then form, practically, the sides of the trough proper, A, and prevent stock from having access to it. This is of special importance in feeding grain to sheep, since if it is attempted to place grain in the trough while the racks are in their normal position, the sheep will crowd around the shepherd or attendant and impede his labor, and the larger and stronger among them will prevent the smaller and weaker from obtaining their due share of the feed. In order to avoid such results, it is the general practice to turn the sheep into a separate yard while placing grain in feed-troughs; but with my improved rack it is unnecessary, since the sheep can be excluded from the trough, and the same left free and open for the shepherd to walk along in it and deposit or scatter grain as he proceeds. The angular or wedge-shaped form of the partition $a$ will in such case cause the grain to divide equally into the two side receptacles or compartments of the trough.

In defining my invention more clearly, I would state that it is not new to employ pivoted side pieces in connection with a double trough so arranged that the side pieces exclude access to the trough when in one position and give access when in another, and I therefore limit my invention to the side pieces having an imperforate portion, $c$, and interlocking arms $b$, which rest upon the raised central portion, $a$, of the trough, which latter operates as a stop. This arrangement permits the device, when in the position shown in Fig. 2, to be used for light provender, in which position the portion $c$ acts as a shed to prevent dirt from sifting into the wool of the sheep, while said part $c$ excludes access to the trough when in the position shown in Fig. 3; also, the refuse matter which the stock will not eat is never allowed to drop into the trough from the rack, but is thrown by the upward movement of the interlocked arms entirely outside of the rack.

What I do claim is—

The combination, with the double trough A, having central ridge, $a$, of the pivoted side sections, B, having interlocking arms $b$, arranged to rest upon the ridge $a$, and imperforate pieces $c$, arranged to operate both as screens for the sheep and as doors to exclude access to the trough, substantially as shown and described.

NELSON E. ALLEN.

Witnesses:
C. E. DICKINSON,
J. H. RICHARDSON.